United States Patent
Yi et al.

(10) Patent No.: US 8,661,532 B2
(45) Date of Patent: Feb. 25, 2014

(54) METHOD AND APPARATUS FOR AUTHENTICATING PASSWORD

(71) Applicant: Soongsil University Research Consortium Techno-Park, Seoul (KR)

(72) Inventors: Jeong Hyun Yi, Seongnam-si (KR); Tae Jin Kim, Seoul (KR); Gun Il Ma, Seoul (KR); Hyun Yi Yi, Incheon (KR); Si Wan Kim, Seoul (KR)

(73) Assignee: Soongsil University Research Consortium Techno-Park, Seoul (KR)

( * ) Notice: Subject to any disclaimer, the term of this patent is extended or adjusted under 35 U.S.C. 154(b) by 0 days.

(21) Appl. No.: 13/623,409

(22) Filed: Sep. 20, 2012

(65) Prior Publication Data

US 2013/0276100 A1 Oct. 17, 2013

(30) Foreign Application Priority Data

Apr. 17, 2012 (KR) .................. 10-2012-0039771

(51) Int. Cl.
 *G06F 7/04* (2006.01)
 *G06F 21/36* (2013.01)
 *H04L 9/32* (2006.01)
 *H04L 29/06* (2006.01)

(52) U.S. Cl.
 CPC ............. *G06F 21/36* (2013.01); *H04L 9/3226* (2013.01); *H04L 63/083* (2013.01); *H04L 9/3271* (2013.01)
 USPC ........................................... 726/19; 713/182

(58) Field of Classification Search
 CPC ..... G06F 21/36; H04L 9/3271; H04L 9/3226; H04L 63/083
 USPC ................... 726/5, 6–7, 18–19; 713/182–184
 See application file for complete search history.

(56) References Cited

U.S. PATENT DOCUMENTS

| | | | |
|---|---|---|---|
| 8,117,458 B2 * | 2/2012 | Osborn et al. | 713/183 |
| 2007/0236330 A1 * | 10/2007 | Cho et al. | 340/5.54 |
| 2007/0277224 A1 * | 11/2007 | Osborn et al. | 726/2 |
| 2008/0098464 A1 * | 4/2008 | Mizrah | 726/5 |
| 2008/0244700 A1 * | 10/2008 | Osborn et al. | 726/2 |
| 2009/0165121 A1 * | 6/2009 | Kumar | 726/19 |
| 2011/0029400 A1 * | 2/2011 | Scipioni | 705/26.4 |
| 2011/0095992 A1 * | 4/2011 | Yeh | 345/173 |
| 2012/0011564 A1 * | 1/2012 | Osborn et al. | 726/2 |
| 2012/0102551 A1 * | 4/2012 | Bidare | 726/4 |
| 2012/0159583 A1 * | 6/2012 | Griffin et al. | 726/5 |
| 2012/0198530 A1 * | 8/2012 | Bodavula | 726/6 |
| 2013/0157729 A1 * | 6/2013 | Tabe | 455/573 |
| 2013/0169568 A1 * | 7/2013 | Park et al. | 345/173 |

FOREIGN PATENT DOCUMENTS

KR 10-2009-0016934 A 2/2009

* cited by examiner

*Primary Examiner* — Samson Lemma
(74) *Attorney, Agent, or Firm* — Sherr & Jiang, PLLC

(57) ABSTRACT

Provided is a method and apparatus for authenticating a password, wherein the method includes: generating at least one input grid cell into which a password is input from among a plurality of grid cells realized on a screen of a user terminal; and authenticating the password when the password is identical to a number of identification grid cells included in an authentication range predetermined based on the at least one input grid cell, wherein the identification grid cells are set to authenticate the password from among the plurality of grid cells. Accordingly, password information may be prevented from being exposed to a third person observer since a variable password is input whenever a user tries password authentication in a terminal.

15 Claims, 4 Drawing Sheets

METHOD AND APPARATUS FOR AUTHENTICATING PASSWORD

CROSS-REFERENCE TO RELATED PATENT APPLICATION

This application claims the benefit of Korean Patent Application No. 10-2012-0039771, filed on Apr. 17, 2012, in the Korean Intellectual Property Office, the disclosure of which is incorporated herein in its entirety by reference.

BACKGROUND OF THE INVENTION

1. Field of the Invention

The present invention relates to a method and apparatus for authenticating a password, and more particularly, to a technology of indirectly authenticating a password by using a variable password.

2. Description of the Related Art

A system including user information should only allow access of a permitted user, and a technology of determining whether access is tried by a permitted lawful user is called a user authentication technology. Such a user authentication technology is widely used to secure logging into an internet website, internet banking, and a user terminal. Also, recently, according to increased supplies of user terminals, such as laptops, smart phones, and tablet personal computers (PCs), an authentication process is frequently performed by using such user terminals in public places.

However, a general user authentication technology using a personal identification number (PIN) is weak against shoulder surfing or a recording attack by a third person, or a spyware/key logger attack since a password of a user is exposed as it is. Consequently, a method of preventing a key logger attack by randomly disposing password numbers has been suggested, but even by using this method, the password may still be exposed via shoulder surfing or a recording attack.

A technology of dividing an image into a plurality of cells and authenticating a password by replacing a cell at a predetermined location with the password has been introduced as a general method of authenticating a user in a mobile terminal. This technology has improved security with respect to a password exposure since a PIN input method is replaced, but the location of the predetermined cell may still be exposed to a third person. A background technology of the present invention is disclosed in KR 10-2009-0016934 published on Feb. 18, 2009.

SUMMARY OF THE INVENTION

The present invention provides a technology for authenticating a password, wherein password information is not exposed to a third person as a variable password is input whenever a user tries password authentication in a terminal.

According to an aspect of the present invention, there is provided a method of authenticating a password performed by an information processing device including at least a processor and a memory storage device, the method including: via the processor, generating at least one input grid cell into which a password is input from among a plurality of grid cells realized on a screen of a user terminal; and via the processor, authenticating the password when the password is identical to a number of identification grid cells included in an authentication range predetermined based on the at least one input grid cell, wherein the identification grid cells are set to authenticate the password from among the plurality of grid cells.

The method may further include a user setting one or more identification grid cells used to authenticate the password.

The generating of the at least one input grid cell may include randomly arranging a location or number of the generated at least one input grid cell in the plurality of grid cells.

The identification grid cells may be expressed by any one of a symbol, a character, a figure, a color, or a combination thereof in the plurality of grid cells.

The identification grid cells may be expressed in the plurality of grid cells only in the setting of the identification grid cells.

The password may be expressed by any one of a symbol, a character, a figure, a color, or a combination thereof, which indicates a number of the identification grid cells, and the authenticating of the password may include authenticating the password when the number of identification grid cells indicated by the password is the same as the number of identification grid cells included in the authentication range.

The authenticating of the password may include determining whether a number of identification grid cells included in a grid cell range located top, down, left, right, and diagonal of the at least one input grid cell is the same as the number of identification grid cells indicated by the password input to the at least one input grid cell.

According to another aspect of the present invention, there is provided an apparatus having at least a processor for authenticating a password, the apparatus including: an input grid cell generator, via the processor, for generating at least one input grid cell into which a password is input from among a plurality of grid cells realized on a screen of a user terminal; and a password authenticator, via the processor, for authenticating the password when the password is identical to a number of identification grid cells included in an authentication range predetermined based on the at least one input grid cell, wherein the identification grid cells are set to authenticate the password from among the plurality of grid cells.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. Terms used herein are selected while considering functions in embodiments, and meanings of the terms may vary according to an intention or user or an operator, or a judicial precedent.

Accordingly, the terms used in following embodiments should follow definitions if defined in the specification, or if not defined, have the same meaning as are commonly understood by one of skill in the art to which this invention belongs.

Figure 1:
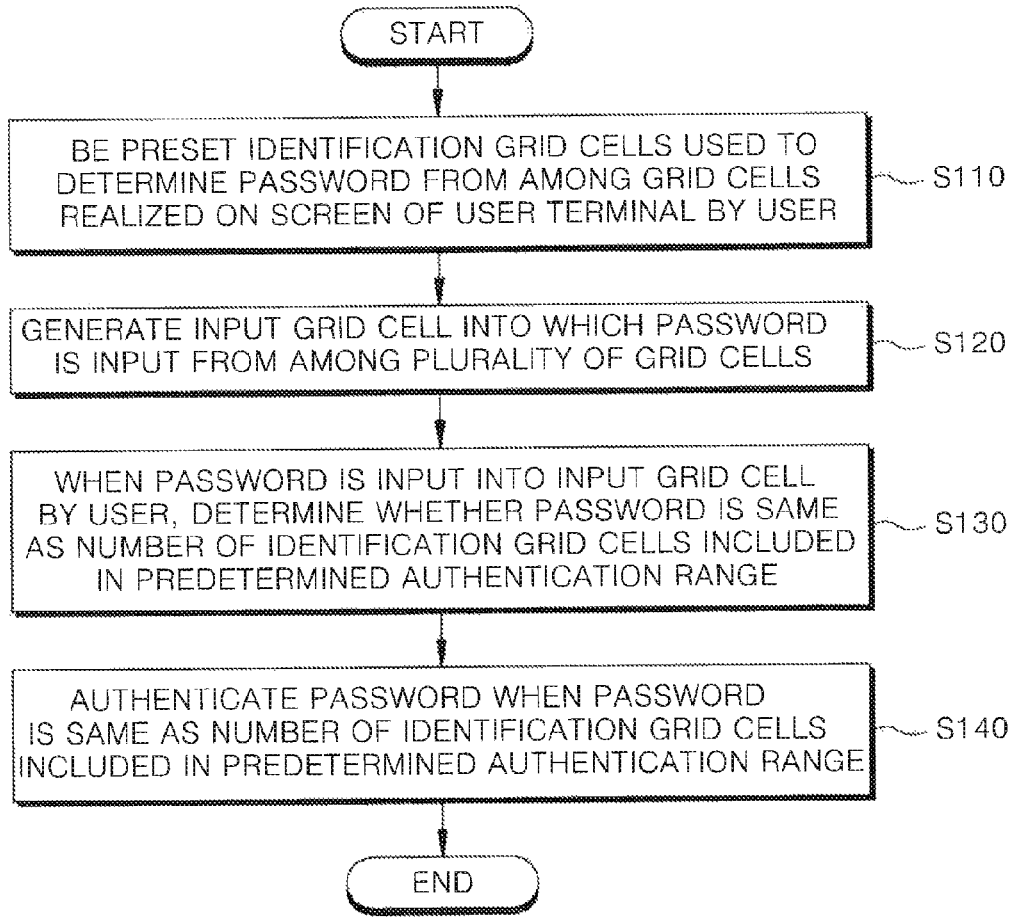
FIG. 1 is a flowchart illustrating a method of authenticating a password, according to an embodiment of the present invention.
Figure 2:
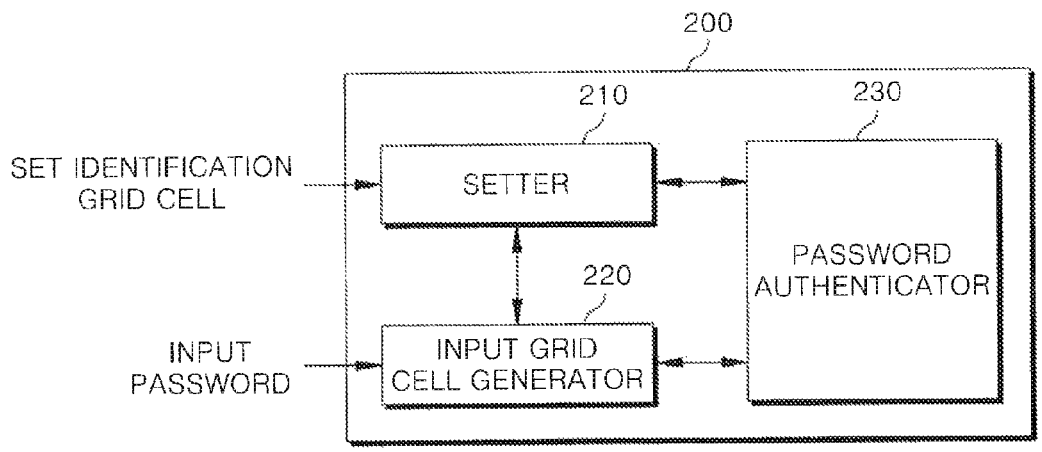
FIG. 2 is a block diagram of an apparatus for authenticating a password, which performs the method of FIG. 1.

FIG. 1 is a flowchart illustrating a method of authenticating a password, according to an embodiment of the present invention, and FIG. 2 is a block diagram of an apparatus 200 for authenticating a password, which performs the method of FIG. 1.

Referring to FIGS. 1 and 2, the apparatus 200 for authenticating a password of a user terminal by using a variable password, according to an embodiment of the present invention includes a setter 210, an input grid cell generator 220, and a password authenticator 230.

First, the setter 210 is preset a plurality of identification grid cells used to determine a password from among a plurality of grid cells realized on a screen of a user terminal by a user, in operation S110. Examples of the user terminal include a desktop computer, an automated teller machine (ATM), a kiosk or a fixed terminal based on the kiosk, and mobile terminals such as a laptop, a tablet personal computer (PC), and a mobile phone. In the user terminal, an input interface and a display may be separated from each other, or alternatively, if a touch screen is used, an input interface may be combined to a display.

Also, the setter 210 generates the plurality of grid cells on the screen of the user terminal, and sets a grid cell selected by the user through an input interface as an identification grid cell. Here, the plurality of grid cells denote a matrix having an N×M lattice shape, and the identification grid cell denotes a grid cell selected by the user to be used to determine a password afterwards from among the plurality grid cells. Also, the identification grid cell may be expressed in any one of a symbol, a character, a figure, a color, or a combination thereof in a grid cell. Thus, the user is able to check the identification grid cell selected by the user.

Also, the setter 210 displays the identification grid cells on the screen of the user terminal only while the identification grid cells are being selected, and does not display the identification grid cells while the user tries authentication of a password afterwards so that only the user who know locations of the identification grid cells is able to authenticate a password, thereby preventing the password from being exposed to a third person.

Then, the input grid cell generator 220 generates at least one input grid cell into which the password is input from among the plurality of grid cells realized on the screen of the user terminal, in operation S120. The input grid cell shows an input window for the user to input the password into the plurality of grid cells. The input grid cell generator 220 may randomly arrange locations or number of input grid cells. For example, the locations or number of input grid cells arranged on the screen of the user terminal may vary whenever the user tries to authenticate the password.

The password input into the input grid cell may be expressed by any one of a symbol, a character, a figure, a color, or a combination thereof that indicates the number of identification grid cells. For example, the password may be set by an Arabic numeral, such as 1, 2, 3, or so on, or may be set by matching an alphabet to a number, such as 'a=0, b=1, c=2, d=3, . . . , j=9, or so on. Alternatively, the password may be expressed in an icon representing an Arabic number of an identification symbol corresponding to the Arabic number.

Then, when the password is input into the input grid cell from the user, the password authenticator 230 determines whether the input password is the same as the number of identification grid cells included in an authentication range predetermined based on the input grid cells, in operation S130. Here, the authentication range is a set of a plurality of grid cells and may vary according to the user. For example, when grid cells located top, bottom, left, right, and diagonal of the input grid cell are set to be the authentication range, total 9 grid cells are set to be the authentication range.

Also, when the password is input to the plurality of input grid cells, the password authenticator 230 determines the password based on each of the input grid cells. According to the password input into each input grid cell, the relative number of identification grid cells according to the location of the input grid cell is input. Also, when the user tries to authenticate the password a plurality of times, the locations and number of the input grid cells differ and thus the input password differs accordingly. Thus, it is possible to input a variable password.

Next, the password authenticator 230 authenticates the password when the password is the same as the number of identification grid cells included in the authentication range predetermined based on the input grid cell, in operation S140. Also, the password authenticator 230 may output an authentication result by using a display or speaker of the user terminal. For example, when the password input by the user is not the same as the number of identification grid cells, a password authentication failure message may be displayed on the screen or an authentication failure alarm may be generated. Accordingly, the user may be able to determine whether the password is authenticated or not.

Figure 3:
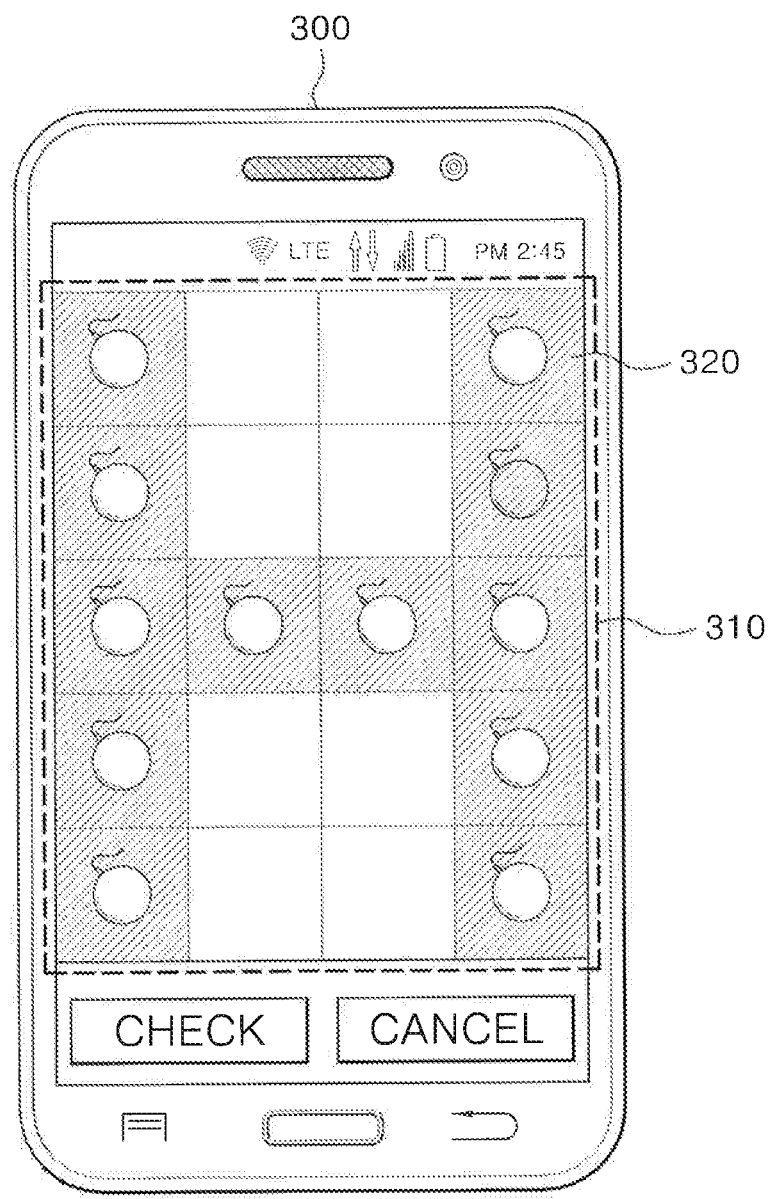
FIG. 3 is a diagram for describing a user setting an identification grid cell, according to the method of FIG. 1.

FIG. 3 is a diagram for describing setting an identification grid cell by a user, according to the method of FIG. 1.

Referring to FIG. 3, a plurality of grid cells 310 are displayed on a screen of a user terminal 300 in a 4×5 matrix, and a user may select identification grid cells 320 by touching the grid cell 310 or manipulating an input interface corresponding to the grid cells 310. 12 grid cells 310 in an "H" shape are selected as the identification grid cells 320 in FIG. 3, but the locations and number of identification grid cells 320 may differ according to setting of the user. The selected identification grid cell 320 may be canceled only by repeatedly touching the corresponding grid cell 310. Also, the identification grid cell 320 is only displayed while setting the identification grid cell 320, and is not displayed while authenticating a password afterwards. Thus, the user must remember the locations of the identification grid cells 320 initially set.

Figure 4:
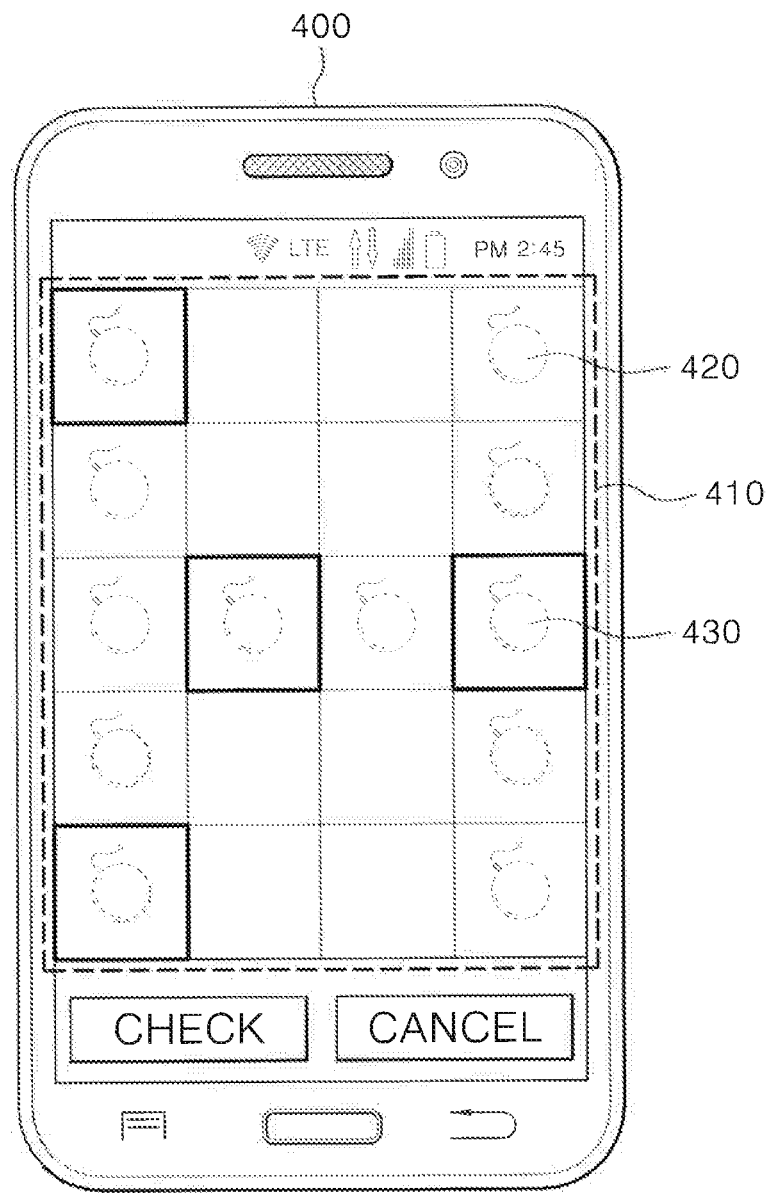
FIG. 4 is a diagram for describing generating an input grid cell according to the method of FIG. 1.

FIG. 4 is a diagram for describing generating an input grid cell according to the method of FIG. 1.

Referring to FIG. 4, after a user set locations of identification grid cells 420, input grid cells 320 from among a plurality of grid cells 410 are formed on a user terminal 400. The identification grid cells 420 are shown in dotted lines in FIG. 4 for convenience of description, but the identification grid cells 420 are not actually displayed to the user. 4 input grid cells 430 are selected in FIG. 4, but locations and number of input grid cells 430 are randomly set. Accordingly, a password input into the input grid cells 430 may vary. When the input grid cell 430 is touched, input interface of a keypad window (not shown) may be generated such that the password expressed in a symbol, a character, a figure, or the like is input.

Figure 5:
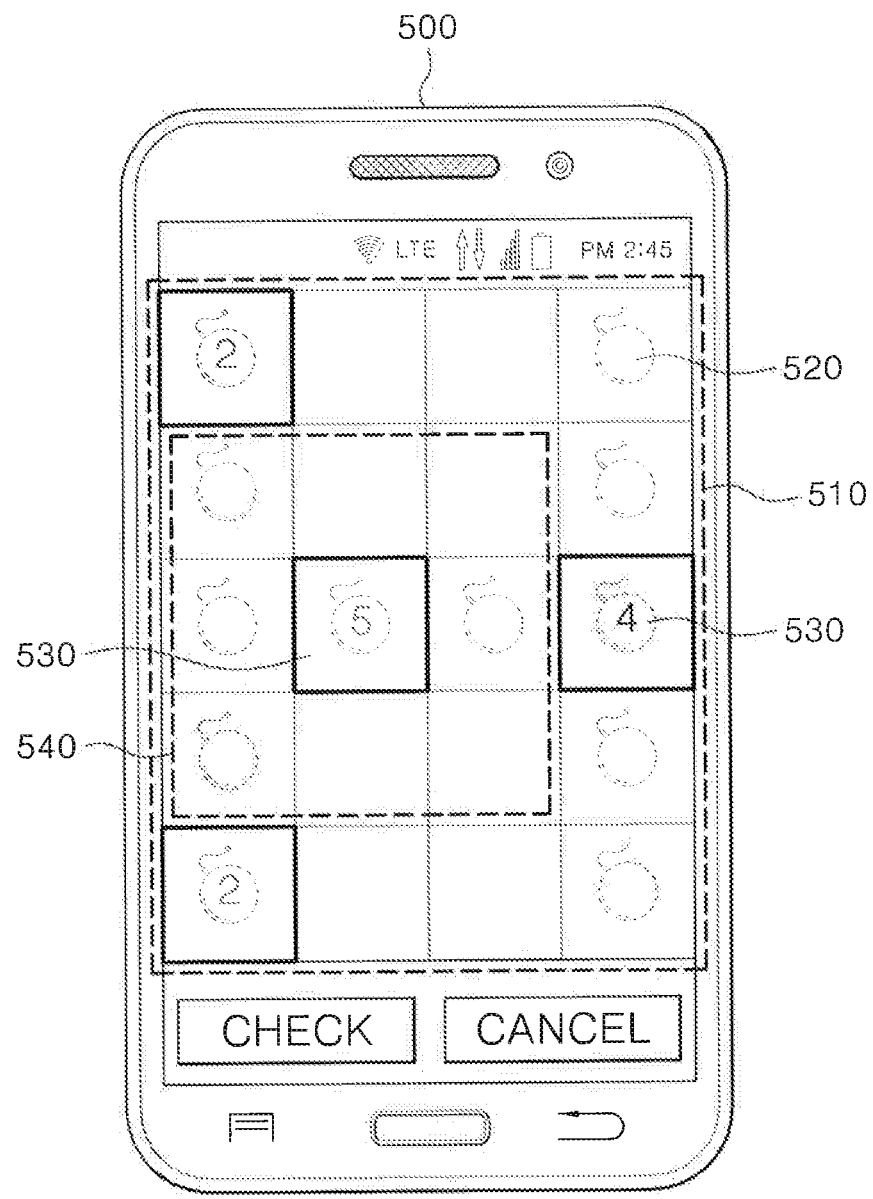
FIG. 5 is a diagram for describing receiving a password from a user to an input grid cell, according to the method of FIG. 1.

FIG. 5 is a diagram for describing receiving a password from a user to an input grid cell, according to the method of FIG. 1.

Referring to FIG. 5, a user inputs a password into input grid cells 530 realized on a screen of a user terminal 500. Identification grid cells 520 are shown in dotted lines in FIG. 5 for convenience of description, but the identification grid cells 520 are not actually shown to the user. In FIG. 5, an authentication range 540 includes total 9 grid cells 510 based on the input grid cell 530.

Since the upper left input grid cell 530 does not have the top and left grid cells 510, the number of identification grid cells 520 is determined by using the right and bottom grid cells 510 as an authentication range. Here, since the number of identification grid cells 520 included in an authentication range is 2, a number "2" is input as the password. Alternatively in the middle left input grid cell 530, total 5 identification grid cells 520 are included in the authentication range 540 including total 9 grid cells 510, and thus a number "5" is input as the password.

In this manner, the password is input to the remaining input grid cells 530, and the password is authenticated when the password input to all input grid cells 530 is same as the number of identification grid cells 520 in each authentication range 540.

As such, according to the embodiments of the present invention, password information may be prevented from being exposed to a third person observer by inputting a variable password whenever a user tries password authentication in a terminal. Also, the user may have fun while looking for locations of identification grid cells set by the user by inputting the number of identification grid cells included in a predetermined range from among a plurality of grid cells.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of authenticating a password, performed by an information processing device including at least a processor and a memory storage device, the method comprising:
via the processor, generating by an input grid cell generator at least one input grid cell for a password input among a plurality of grid cells implemented on a screen of a user terminal, the input grid cell having an input window for an user to input the password; and
via the processor, authenticating by a password authenticator the password when the password is identical to a number of identification grid cells included in an authentication range predetermined based on the at least one input grid cell,
wherein the identification grid cells are set to authenticate the password among the plurality of grid cells.

2. The method of claim 1, further comprising, via the processor, setting by the user one or more identification grid cells to authenticate the password.

3. The method of claim 1, wherein the generating of the at least one input grid cell comprises, via the processor, randomly arranging a location or number of the generated at least one input grid cell in the plurality of grid cells.

4. The method of claim 1, wherein the identification grid cells are expressed by anyone of a symbol, a character, a figure, a color, or a combination thereof in the plurality of grid cells.

5. The method of claim 4, wherein the identification grid cells are expressed in the plurality of grid cells only in the setting of the identification grid cells.

6. The method of claim 1, wherein the password is expressed by anyone of a symbol, a character, a figure, a color, or a combination thereof, which indicates a number of the identification grid cells, and
the authenticating of the password comprises, via the processor, authenticating the password when the number of identification grid cells indicated by the password is the same as the number of identification grid cells included in the authentication range.

7. The method of claim 6, wherein the authenticating of the password comprises, via the processor, determining whether a number of identification grid cells included in a grid cell range located top, down, left, right, and diagonal of the at least one input grid cell is the same as the number of identification grid cells indicated by the password input to the at least one input grid cell.

8. A recording medium having recorded thereon a program executable by the user terminal performing the method of claim 1.

9. An apparatus having at least a processor for authenticating a password, the apparatus comprising:
an input grid cell generator, via the processor, generating at least one input grid cell for a password input among a plurality of grid cells implemented on a screen of a user terminal, the input grid cell having an input window for an user to input the password; and
a password authenticator, via the processor, authenticating the password when the password is identical to a number of identification grid cells included in an authentication range predetermined based on the at least one input grid cell,
wherein the identification grid cells are set to authenticate the password from among the plurality of grid cells.

10. The apparatus of claim 9, further comprising a setter for the user to set one or more identification grid cells to authenticate the password.

11. The apparatus of claim 9, wherein the input grid cell generator, via the processor, randomly arranges a location or number of the generated at least one input grid cell in the plurality of grid cells.

12. The apparatus of claim 9, wherein the identification grid cells are expressed by anyone of a symbol, a character, a figure, a color, or a combination thereof in the plurality of grid cells.

13. The apparatus of claim 12, wherein the identification grid cells are expressed in the plurality of grid cells only while the identification grid cells are set.

14. The apparatus of claim 9, wherein the password is expressed by anyone of a symbol, a character, a figure, a color, or a combination thereof, which indicates a number of the identification grid cells, and
the password authenticator, via the processor, authenticates the password when the number of identification grid cells indicated by the password is the same as the number of identification grid cells included in the authentication range.

15. The apparatus of claim 14, wherein the password authenticator, via the processor, determines whether a number of identification grid cells included in a grid cell range located top, down, left, right, and diagonal of the at least one input grid cell is the same as the number of identification grid cells indicated by the password input to the at least one input grid cell.

* * * * *